UNITED STATES PATENT OFFICE.

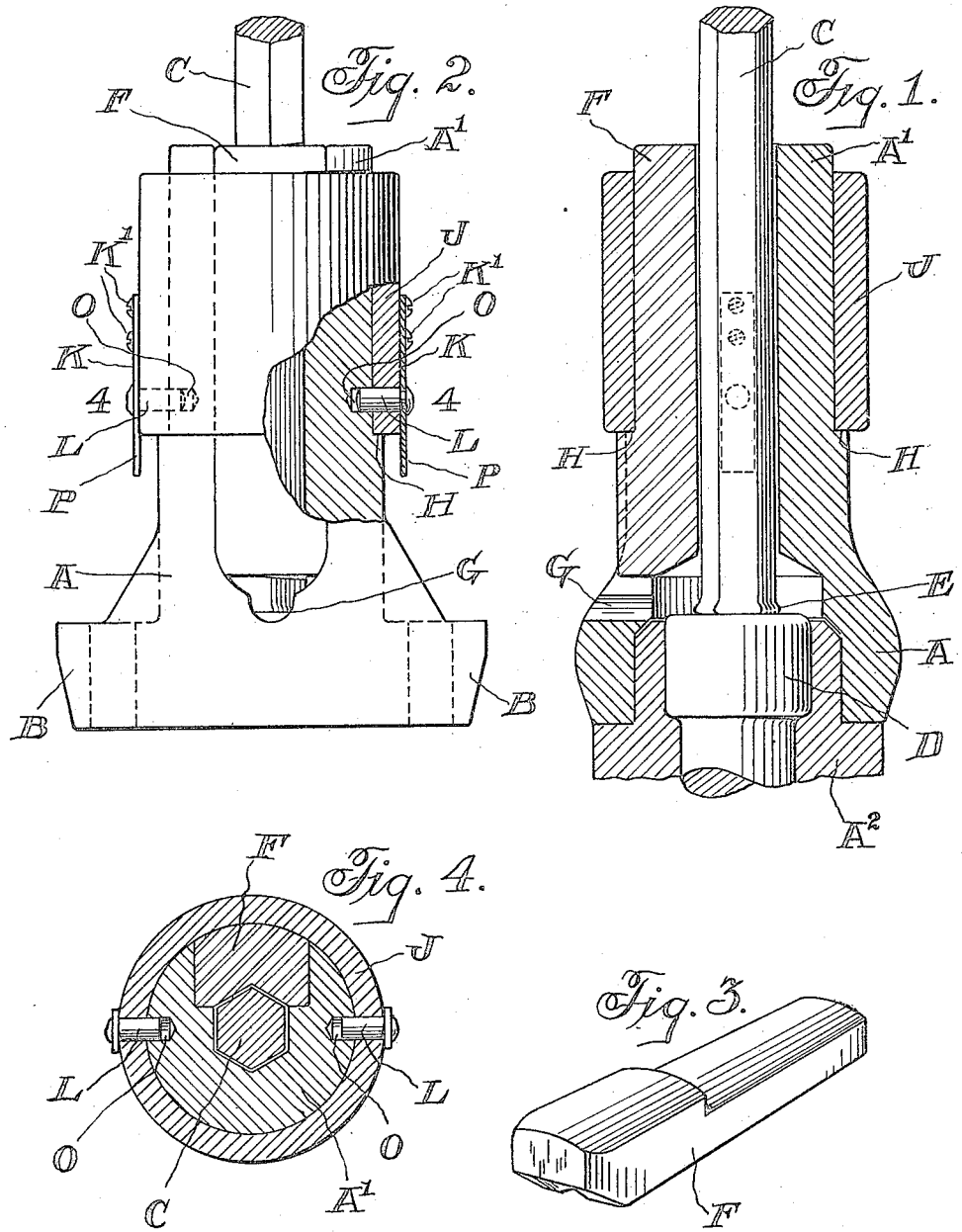

CARL P. BEAVER, OF LYNCH, KENTUCKY, ASSIGNOR TO INGERSOLL-RAND COMPANY, OF JERSEY CITY, NEW JERSEY, A CORPORATION OF NEW JERSEY.

FRONT HEAD FOR ROCK DRILLS.

1,403,284.  Specification of Letters Patent.  Patented Jan. 10, 1922.

Application filed July 23, 1920. Serial No. 398,384.

*To all whom it may concern:*

Be it known that I, CARL P. BEAVER, a citizen of the United States, residing at Lynch, in the county of Harlan, State of Kentucky, have invented a certain new and useful Improvement in Front Head for Rock Drills, of which the following is a specification.

This invention relates to a front head or chuck for rock drills of the hammer type, in which the drill steel is adapted to extend through the bore or axial opening of the front head into position to be struck by the hammer.

In spit of every reasonable precaution, and the skill of the best blacksmiths, a drill steel will occasionally be furnished to the drill operators having a relatively soft shank, which will swell or become upset at the end being struck by the hammer, so that it becomes impossible to withdraw the steel axially or longitudinally through the front head and whether the miner is using a solid front head or a front head having a bushing, it becomes necessary to remove the front head, lay the drill steel on a piece of track or other support to form an anvil, and pound the upset portion of the shank until the end is small enough to pass through the front head or the bushing, as the case may be, after which the machine is reassembled and the work is continued. The operation described is troublesome and vexatious even with a hexagon shank, but particularly difficult with a cruciform shank and in any case much valuable time is lost.

The primary object of the present invention is to enable the distorted drill steel to be removed from the front head laterally in case it cannot be withdrawn longitudinally, after which another drill steel may be inserted in the machine without loss of time.

To these and other ends the invention consists of the preferred construction of front head shown in the accompanying drawings, in which,—

Figure 1 is a longitudinal sectional view taken through a front head constructed in accordance with this invention, Figure 2 is a side elevation of the front head partly broken away.

Figure 3 is a detail perspective view of the removable section of the front head, and Figure 4 is a transverse sectional view of Figure 2 through the front head.

The drawings represent a front head construction or chuck suitable for a stopping drill. The front head A having the usual nose portion A' is provided with flanges B for securing the front head to the cylinder $A^2$ of the rock drill by means of the usual side bolts (not shown). The drill steel C is shown in this instance of hexagonal section although any suitable section may be used. The shank of the drill steel C, as shown in Figure 1, extends through the straight axial opening of the front head into position to receive the force of impact from the anvil block D and as indicated in the drawing, the end of the shank has swelled or become upset at E so that the drill steel cannot be withdrawn axially or longitudinally through the opening of the front head. The opening in the front head is non-circular in cross section corresponding to but larger than the cross section of the shank of the drill steel so that the shank may normally be inserted and withdrawn axially unless the end becomes upset.

In accordance with this invention means are provided for removing the drill steel from the front head or chuck laterally in case the inner end becomes upset so that it cannot be withdrawn longitudinally and for this purpose the chuck is provided with a removable wall section F extending longitudinally of the chuck to a point in proximity to the dust hole G. The walls of the nose portion A' of the front head A and the removable wall section F are preferably provided with shoulders H which register when the wall section is inserted in the opening in the front head and suitable means are also provided for retaining the removable wall section F in position in the front head, in this instance a sleeve J being shown adapted to fit over the sections of the front head and seat upon the shoulders H. Suitable provision is afforded for retaining the sleeve on the front head, in this instance said sleeve being provided with spring retaining means in the form of spring fingers K suitably secured to the sleeve as by means of the screws K' and provided with locking means in the form of pins L adapted to seat in recesses O in the walls of the main portion of the front head. These spring fingers preferably extend rearwardly beyond the sleeve J as indicated at P so that they may be pried or sprung outwardly in order to release the pins L and permit the sleeve J to be withdrawn from the front head, in which case the wall section F may be taken out and the drill steel removed from the front head laterally through the opening in the wall of the front head.

I claim:

1. A front head for rock drills of the hammer type, said front head having a straight uniform axial opening non-circular in cross section corresponding to but larger than the cross section of the shank of the drill steel, through which the shank of the drill steel is adapted to extend into position to receive the impact blow of the hammer, so that the shank of the drill steel may normally be inserted and withdrawn axially, and means for removing the drill steel from the front head laterally in case the inner end becomes upset so that it cannot be withdrawn axially.

2. A front head for rock drills of the hammer type, said front head having a straight uniform axial opening non-circular in cross section corresponding to but larger than the cross section of the shank of the drill steel, through which the shank of the drill steel is adapted to extend into position to receive the impact blow of the hammer, so that the shank of the drill steel may normally be inserted and withdrawn axially, and a removable wall section or piece extending longitudinally of the front head to permit the drill steel to be removed laterally from the front head in case the inner end becomes upset so that it cannot be withdrawn axially.

3. A front head for rock drills of the hammer type, said front head having a straight uniform axial opening non-circular in cross section corresponding to but larger than the cross section of the shank of the drill steel, through which the shank of the drill steel is adapted to extend into position to receive the impact blow of the hammer, so that the shank of the drill steel may normally be inserted and withdrawn axially, a removable wall section or piece extending longitudinally of the front head to permit the drill steel to be removed laterally from the front head in case the inner end becomes upset so that it cannot be withdrawn axially, and means for retaining the said removable wall section in position in the front head.

4. A front head for rock drills of the hammer type, said front head having a straight uniform axial opening non-circular in cross section corresponding to but larger than the cross section of the shank of the drill steel, through which the shank of the drill steel is adapted to extend into position to receive the impact blow of the hammer so that the shank of the drill steel may normally be inserted and withdrawn axially, a removable wall section or piece extending longitudinally of the front head to permit the drill steel to be removed laterally from the front head in case the inner end becomes upset so that it cannot be withdrawn axially, and a sleeve adapted to fit over the sections of the front head for retaining the section in the front head.

5. A front head for a rock drill of the hammer type, said front head being provided with a nose portion having a straight uniform axial opening non-circular in cross section corresponding to but larger than the cross section of the shank of the drill steel, through which the shank of the drill steel is adapted to extend into position to receive the impact blow of the hammer, so that the shank of the drill steel may normally be inserted and withdrawn axially, and also having a removable wall section or piece extending longitudinally of the nose portion and of a width sufficient to permit the drill steel in case the inner end becomes upset to be removed from the front head laterally when the wall section is removed, and a sleeve adapted to fit over the sections of the nose piece and provided with retaining means for retaining the sleeve on the front head.

6. A front head for a rock drill of the hammer type, said front head being provided with a nose portion having a straight uniform axial opening non-circular in cross section corresponding to but larger than the cross section of the shank of the drill steel, through which the shank of the drill steel is adapted to extend into position to receive the impact blow of the hammer so that the shank of the drill steel may normally be inserted and withdrawn axially, and also having a removable wall section or piece extending longitudinally of the nose portion and of a width sufficient to permit the drill steel in case the inner end becomes upset to be removed from the front head laterally when the wall section is removed, and a sleeve adapted to fit over the sections of the nose piece and provided with rearwardly extending spring retaining fingers, having projections adapted to engage recesses in the main portion of the front head for retaining the sleeve on the front head.

In testimony whereof I have signed this specification.

CARL P. BEAVER.